United States Patent [19]

Haley

[11] Patent Number: 4,529,878

[45] Date of Patent: Jul. 16, 1985

[54] DETERMINATION OF RESIDUAL OIL SATURATION USING THERMAL NEUTRON DECAY MEASUREMENTS WITHOUT KNOWLEDGE OF THE FORMATION OR FORMATION FLUIDS

[75] Inventor: Ronald A. Haley, Slidell, La.

[73] Assignee: Shell Oil Company, Houston, Tex.

[21] Appl. No.: 422,812

[22] Filed: Sep. 24, 1982

[51] Int. Cl.$^3$ ............................................. G01V 5/10
[52] U.S. Cl. .................................................. 250/269
[58] Field of Search ................ 250/269, 259, 301, 391

[56] References Cited

U.S. PATENT DOCUMENTS

| | | | |
|---|---|---|---|
| 3,562,523 | 2/1971 | Richardson et al. | 250/259 |
| 3,631,245 | 12/1971 | Jorden, Jr. et al. | 376/167 |
| 3,748,474 | 7/1973 | Murphy | 250/259 |
| 4,191,883 | 3/1980 | Albright et al. | 250/259 |
| 4,349,737 | 9/1982 | Smith et al. | 250/259 |

Primary Examiner—Janice A. Howell
Assistant Examiner—Constantine Hannaher

[57] ABSTRACT

A method for determining residual oil saturation of a formation using an improved log-inject-log technique that does not require knowledge of the porosity of the formation or any other property of the formation or its indigenous fluids. The method consists of injecting a first fluid to remove the formation waters and logging the formation to determine the thermal neutron cross section and then injecting a second fluid having a different cross section to displace the first fluid, then re-logging the formation. Next, the residual oil and gas are swept from the formation by a chemical flood followed by the injection of a third fluid to displace the chemical flood. The formation is logged and a fourth fluid injected to displace the third fluid and the formation is logged again. Normally, the first and third and second and fourth injection fluids will be the same.

4 Claims, No Drawings

DETERMINATION OF RESIDUAL OIL SATURATION USING THERMAL NEUTRON DECAY MEASUREMENTS WITHOUT KNOWLEDGE OF THE FORMATION OR FORMATION FLUIDS

BACKGROUND OF THE INVENTION

The present invention pertains to a method for determining the hydrocarbon saturation of a formation penetrated by a cased or partially cased borehole. A hydrocarbon bearing formation containing crude oil is normally subject to a primary production cycle during which the crude may be produced by a natural gas or water drive or by an artificial lift means such as pumping. As the primary production rate decreases with time the question arises of whether it is economical to subject the formation to additional recovery process such as water, chemical or miscible flood. The economics of any recovery process depends to a great extent on the residual oil saturation remaining in the formation. In cased boreholes it is impossible to use more conventional methods such as electrical logs or nuclear magnetic logs for determining the residual oil saturation. Also, conventional methods generally provide less accuracy than nuclear logs. While very rough estimates of the residual oil in place can be made from cumulative oil produced and original estimates of the oil in place, these are not nearly accurate enough when expensive recovery processes are used. Further, in older wells the original logs are not always available and if available may be inaccurate.

In an attempt to solve the above problems U.S. Pat. No. 3,562,523 proposed a method which is referred to as a log-inject-log technique. In particular, the well is first logged using a tool that measures the thermal neutron capture rate of the formation after which the formation or indigenous water is replaced with a second water having a materially different cross section than formation waters without displacing the residual oil. As used in the following description, the term water refers to a water miscible liquid that may contain various salts or other additives. The formation is again logged to obtain a second measurement of the thermal neutron decay rate. One can determine the residual oil in place from the two logs plus the porosity and neutron capture cross section of the indigenous formation water and injected fluids. From the above description of the method disclosed in U.S. Pat. No. 3,562,523, it is apparent that one has to determine the porosity and cross section of the formation water to obtain the residual oil saturation. In older wells porosity information is usually missing and accurate measurements of the formation water cross section are difficult or impossible.

In an attempt to eliminate the problem of obtaining the porosity of a formation, U.S. Pat. No. 3,631,245 suggests that in place of removing only the water from the formation, the hydrocarbons could be removed from the formation. In particular, the patent suggests first logging the well to obtain the thermal neutron capture rate of the formation with the indigenous oil and formation water in place. Next the oil is removed from the formation by means of a chemical flood or the like after which the chemical flood was removed from the formation using the indigenous waters from the formation. The well is again logged to obtain the thermal neutron capture rate and the residual oil determined from the two logging measurements. The patent also suggested that one could follow the second logging measurement with a second displacement using an aqueous liquid having a materially different neutron capture cross section than the indigenous waters. After the second displacement the well is again logged which provides sufficient data for determining the residual oil saturation without requiring any knowledge of porosity. While this method eliminates the need for knowing the porosity and cross section of the formation matrix it does require knowledge of the thermal neutron capture rate of the indigenous waters immediately surrounding the wellbore.

SUMMARY OF THE INVENTION

The present invention provides a means for obtaining the residual oil saturation of a formation without requiring any knowledge of the formation porosity or the thermal neutron capture cross section of the injected or indigenous fluids. The elimination of the need to know any formation cross sections plus preselection of the injection fluids of greatly different cross sections improves the accuracy of the residual oil saturation measurement. The new technique consists of performing a log-inject-log process as described in the '523 patent followed by a chemical flood removal of the oil in place. After the chemical flood the log-inject-log process is again repeated using the same fluids that were used in the first log-inject-log process. This will assure that all the fluids used have the same thermal neutron capture cross sections.

If the same fluids are used after removing the oil, it is not necessary to know the exact thermal neutron capture cross sections of any of the fluids in order to obtain the residual oil saturation. Using the measured logging values, one can obtain the residual oil saturation from the following expression:

$$S_{or} = 1 - \frac{(\Sigma_{L2} - \Sigma_{L1})}{(\Sigma_{L4} - \Sigma_{L3})}$$

It should be noted that this expression includes only the measured logging data and does not include either the porosity, the cross sections of the injected fluids or any other formation property.

DESCRIPTION OF THE PREFERRED EMBODIMENTS

To simplify the present description, the teachings of U.S. Pat. Nos. 3,562,523 and 3,613,245 are incorporated in the present specification by reference. As explained above, these patents both teach a log-inject-log technique for determining residual oil saturation. The difference between the two patents is that patent '245 teaches the use of a chemical flood to remove the oil phase from the formation while patent '523 teaches the use of a second aqueous liquid to remove the aqueous or water phase from the formation.

The present invention utilizes the log-inject-log technique of U.S. Pat. No. 3,562,523. In particular, one first displaces the indigenous water from the formation with another water and obtains a thermal neutron decay log of the formation using one of the commercially available logging tools. In the case of formations containing substantially fresh water one could use a slightly saline water for the flooding water to displace the indigenous water. The water injected in the formation to remove the indigenous water should remove only the water and leave the oil in place.

Following the logging of the formation, the first flood water is removed using a second flood water having a thermal neutron capture cross section with as large a difference in magnitude as practical from the first flood water. The formation is again logged with the second flood water in the formation.

Following the second logging step one removes the indigenous oil in place using a chemical flooding technique. For example, a solvent which is sold under the trade name NEODOL ® manufactured by Shell Chemical Company, can be used to remove the indigenous oil. Following removal of the oil, the solvent is removed from the formation using another flood water, preferably the same flood water as used for removing the indigenous formation water. Following removal of the chemical flood the formation is again logged using the thermal neutron decay logging tool. After the third logging run, the formation is again flooded with water; preferably the same flood water as used prior to the second logging run. This will ensure that both flood waters have the same thermal neutron capture cross section which will greatly simplify the calculations as shown in the following discussion. Following the injection of the fourth flood water the formation is logged using a thermal neutron decay logging tool.

From the above brief discussion of the method of the present invention, it is seen that four separate measurements have been obtained of the neutron capture cross section of the formation under different formation conditions. For example, after the first logging run, one can show the following expression defines the residual oil in place:

$$S_{or} = 1 - \left[ \frac{\Sigma_{L2} - \Sigma_{L1}}{\Sigma_{W2} - \Sigma_{W1}} \right] \frac{1}{\phi} \tag{2}$$

where
$\Sigma W1$ = thermal neutron capture cross section of the first flood water.
$\Sigma W2$ = thermal neutron capture cross section of the second flood water.
$\Sigma L1$ = formation thermal neutron capture cross section from first log.
$\Sigma L2$ = formation thermal neutron capture cross section from second log.
$\phi$ = porosity of formation as a fraction.

Following the removal of the indigenous oil in place with a chemical or solvent flood one could show that the following expression defines the fluid in the formation:

$$S_w \phi = \frac{\Sigma_{L4} - \Sigma_{L3}}{\Sigma_{W4} - \Sigma_{W3}} \tag{3}$$

since the oil has been displaced $S_w = 1$ then $$\phi = \frac{\Sigma_{L4} - \Sigma_{L3}}{\Sigma_{W4} - \Sigma_{W3}} \tag{4}$$

where:
$\Sigma W3$ = thermal neutron capture cross section of the third flood water.
$\Sigma W4$ = thermal neutron capture cross section of the fourth flood water.
$\Sigma L3$ = formation thermal neutron capture cross section from third log.
$\Sigma L4$ = formation thermal neutron capture cross section from fourth log.

Substituting expression (4) in expression (2) one obtains the following:

$$S_{or} = 1 - \left[ \frac{\Sigma_{L2} - \Sigma_{L1}}{\Sigma_{W2} - \Sigma_{W1}} \right] \left[ \frac{\Sigma_{W4} - \Sigma_{W3}}{\Sigma_{L4} - \Sigma_{L3}} \right] \tag{5}$$

If the same water was used for the first and third floods and the second and fourth, the above expression reduces to:

$$S_{or} = 1 - \frac{(\Sigma_{L2} - \Sigma_{L1})}{(\Sigma_{L4} - \Sigma_{L3})} \tag{6}$$

The above expression does not contain either the porosity or capture cross section of the formation water or hydrocarbons, all of which are difficult to accurately measure. Further, since the original formation water is displaced with a flood water having a known capture cross section one does not have to measure the capture cross section of the formation indigenous water. The elimination of the need to measure the cross sections and need to know the porosity improves the accuracy of the residual oil determination. It is much easier to measure capture cross sections of homogeneous water at the surface than to recover representative samples of the formation waters.

While there are no express limits on neutron capture cross sections of the various flood waters used, it is apparent from the above expressions that if the difference between the cross sections of the first and the second waters in large, better results will be obtained.

In this method, unlike the method of patent '245 which is bound to the capture cross section of indigenous formation water for one value, complete freedom is allowed in mixing the two (or four) flood water of fluids used. Thus, one may obtain the optimum difference in fluid cross sections. As mentioned, this improves the statistical accuracy of the result.

What is claimed is:
1. A method for determining the residual oil saturation of a formation comprising:
replacing the formation water with a first fluid having a known thermal neutron capture cross section;
logging the formation to determine the thermal neutron capture cross section;
replacing the first fluid with a second fluid having a known thermal neutron cross section that is different than the first fluid;
relogging the formation to determine the thermal neutron capture cross section;
removing the residual hydrocarbons and second fluid from the formation and replacing them with a third fluid having a known thermal neutron cross section;
relogging the formation to determine the thermal neutron capture cross section;
replacing the third fluid with a fourth fluid having a known thermal neutron capture cross section;
relogging the formation to determine the thermal neutron capture cross section; and
computing the residual oil saturation using only the known thermal neutron capture cross sections of the fluids and the measured thermal neutron capture cross section of the formation with the various fluids present in the formation.

2. The method of claim 1 wherein the residual hydrocarbons and second fluid are removed using a chemical flooding technique.

3. The method of claim 1 wherein the first and third fluids are the same and the second and fourth fluids are the same.

4. The method of claim 3 wherein the residual oil saturation is computed using the expression $$S_{or} = 1 - \left[ \frac{\Sigma_{L2} - \Sigma_{L1}}{\Sigma_{L4} - \Sigma_{L3}} \right]$$

where $\Sigma L1$, $\Sigma L2$, $\Sigma L3$ and $\Sigma L4$ are the responses from the various logging operations.

* * * * *